May 14, 1935.    B. J. UKROPINA    2,001,043
CONCRETE PIPE JOINT
Filed July 21, 1933    2 Sheets-Sheet 1
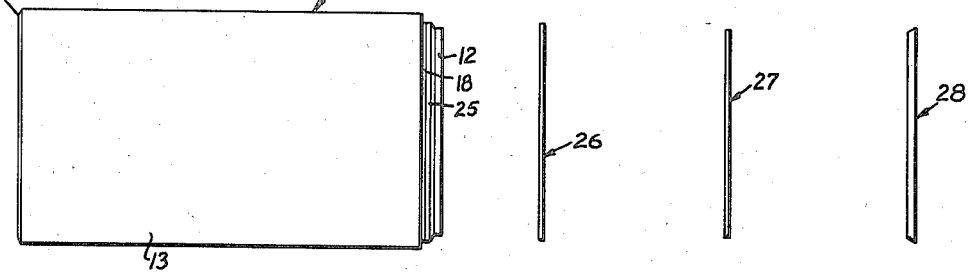
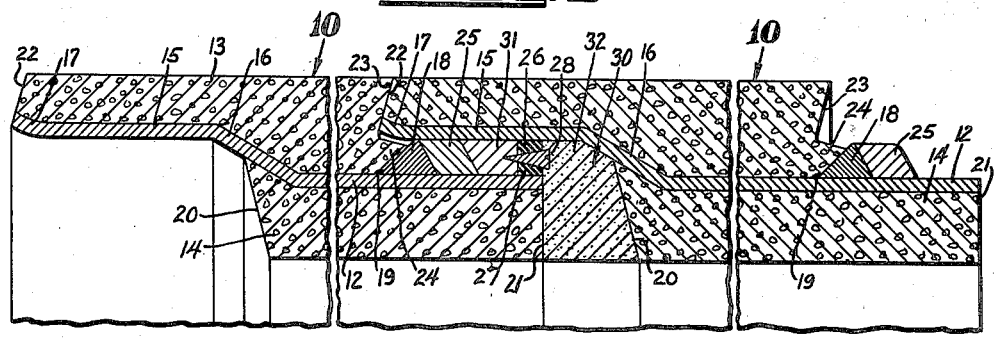
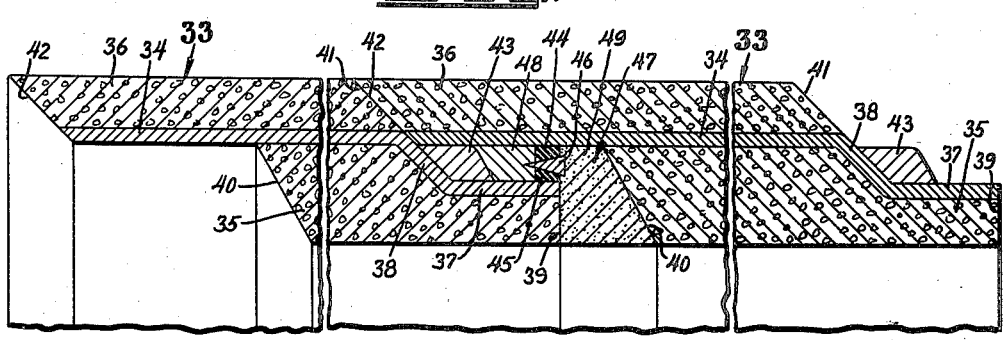
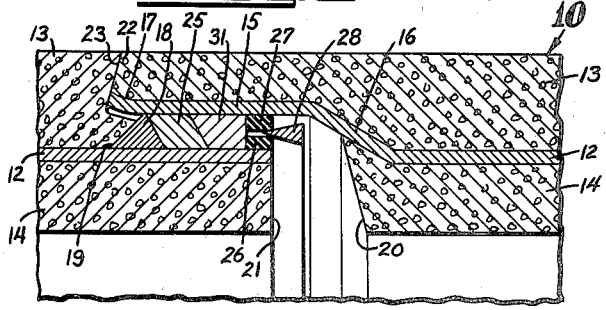
INVENTOR.
B. J. UKROPINA.
BY
ATTORNEY.

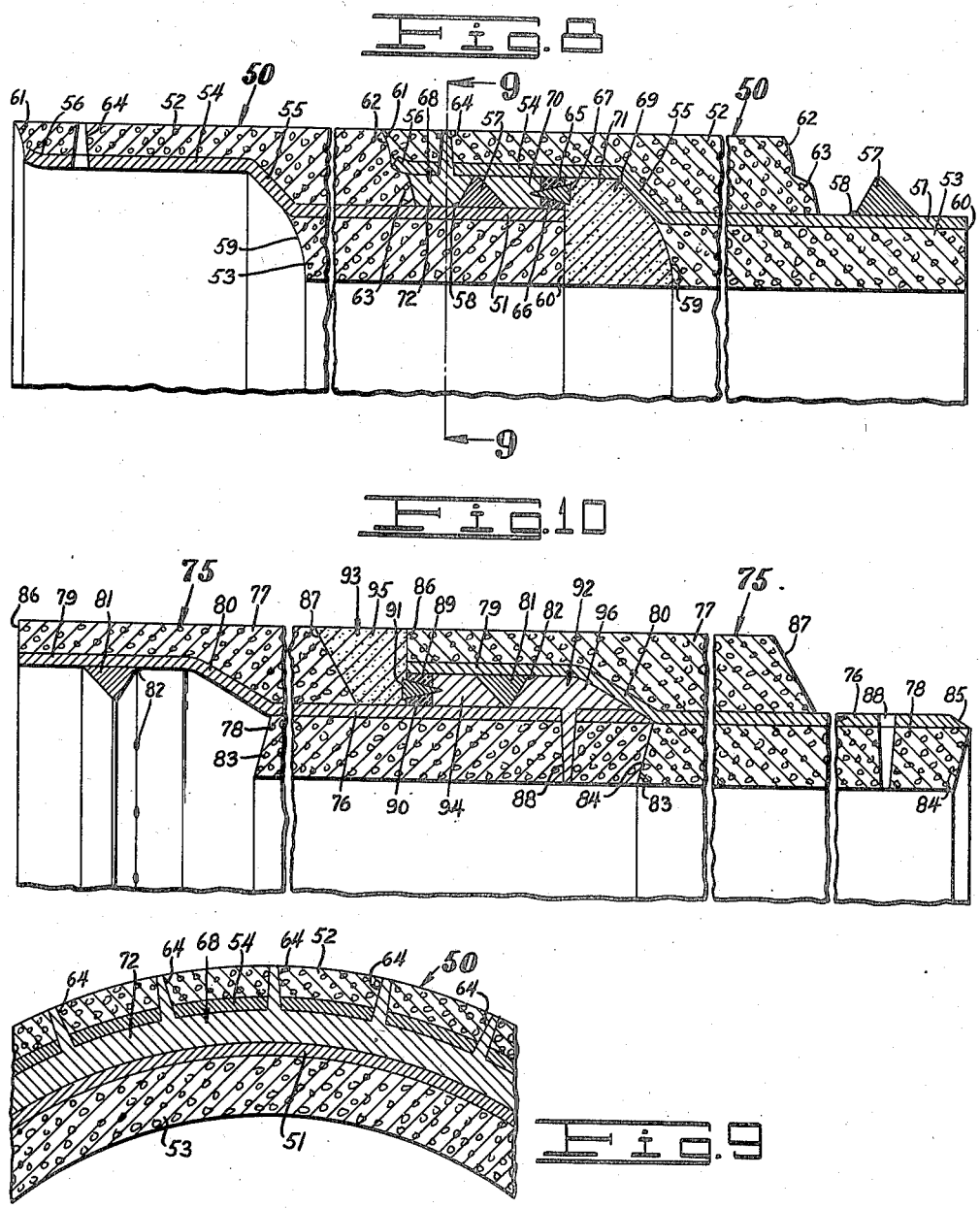

Patented May 14, 1935

2,001,043

UNITED STATES PATENT OFFICE 2,001,043

CONCRETE PIPE JOINT

Bozidar J. Ukropina, Los Angeles, Calif.

Application July 21, 1933, Serial No. 681,553

3 Claims. (Cl. 72—53)

This invention relates to improvement in concrete pipe joints.

The general object of the invention is to provide an improved concrete pipe joint for connecting two lengths of pipe.

Another object of the invention is to provide an improved bell and spigot pipe joint construction which may be caulked from the inside.

A further object of the invention is to provide a bell and spigot pipe joint construction including a novel packing which is poured in a molten material.

Other objects and the advantages of this invention will be apparent from the following description taken in connection with the accompanying drawings wherein:

Fig. 1 is a side elevation of a length of concrete pipe embodying the features of my invention;

Fig. 2 is a side elevation of the outer ring of resilient material used in forming a joint between two lengths of pipe;

Fig. 3 is a view similar to Fig. 2 of the inner ring of resilient material;

Fig. 4 is a side elevation of the wedge ring used in forming a joint;

Fig. 5 is an enlarged fragmentary section through two lengths of the pipe shown in Fig. 1 showing details of my improved joint construction;

Fig. 6 is a fragmentary view similar to Fig. 5 showing the joint in the course of completion;

Fig. 7 is a view similar to Fig. 5 showing a modified form of joint construction;

Fig. 8 is another view similar to Fig. 5 showing a further modified form of joint construction;

Fig. 9 is a section taken on line 9—9 of Fig. 8; and,

Fig. 10 is a view similar to Fig. 8 showing another modified form of joint.

Referring to the drawings by reference characters I have indicated a length of pipe embodying the features of my invention generally at 10. As shown the pipe 10 comprises a metal reinforcing cylinder 12 embedded between an outer layer of concrete 13 and an inner layer of concrete 14. At one end the cylinder includes an enlarged bell section 15 which joins the main portion of the cylinder in a tapered surface 16. The outer end of the bell section 15 is preferably curved outwardly as indicated at 17. Adjacent the opposite end of the cylinder I provide thereon a metal band 18 which is spaced inward from the adjacent end of the cylinder. The band 18 is shown as triangular in cross-section with the base engaging the cylinder 12 and secured thereto as by spot welding as indicated at 19. The outside diameter of the band 18 is approximately the same size as the inside diameter of the bell section 15 of the cylinder. Adjacent the bell end of the pipe the inner layer of concrete 14 terminates in an outwardly beveled surface 20 which intersects the tapered portion 16 of the bell section intermediate the length thereof. At the opposite end the inner layer of concrete terminates in a plane face 21 flush with the adjacent end of the cylinder. At the bell end of the pipe the outer layer of concrete 13 terminates in an outwardly beveled face 22 flush with the end of the bell section. The opposite end of the outer layer of concrete 13 is set inward from the band 18 and terminates in an inwardly beveled face 23 having extending therefrom a reduced neck portion 24 which engages the inner face of the band 18.

Positioned on the cylinder 12 adjacent the band 18 I provide a ring of preformed packing material 25 the outer diameter of which is of approximately the same size as that of the outer diameter of the band 18. The inner end face of the packing ring 25 abuts the outer face of the band 18 and the outer end face of the packing ring is spaced inward from the adjacent end of the cylinder 12.

In forming a joint between two lengths of the pipe 10 I use an outer ring of resilient material 26 such as a rubber composition which is shown in elevation in Fig. 2, an inner ring 27 of similar material shown in elevation in Fig. 3 and a metal wedge ring 28 shown in elevation in Fig. 4. This wedge ring 28 is triangular in cross section having the apex at one side thereof. When joining two lengths of pipe 10 the resilient rings 26 and 27 and the metal wedge ring 28 are positioned in the bell end of one pipe, which is then positioned over the plane end of another pipe to be joined thereto. The adjoining pipes are positioned so that the end 22 of the outer layer of concrete of one pipe engages the end 23 of the other pipe in which position a chamber 30 is left between the ends 20 and 21 of the inner layers of concrete.

After the pipes have been thus positioned together a caulking material 31 such as lead wool is positioned in the space between the bell section 15 of one pipe and the cylinder 12 of the other pipe. The caulking 31 is tightly driven against the packing 25 and extends from the packing 25 to a distance spaced from the adjacent end of the cylinder. After the caulking 31 has been placed in position the inner resilient ring 27 is placed around the cylinder 12 between the caulking 31 and the adjacent end of the cylinder and then the outer resilient ring 26 is placed over the first ring. Then the wedge ring 28 is positioned between the resilient rings 26 and 27 as shown in Fig. 6. Thereafter the wedge ring is driven between the two rings 26 and 27 into the caulking material 31 as shown in Fig. 5.

As the wedge ring 28 is driven into the caulking material 31 it forces the ring 26 into tight engagement with the inner surface of the adjacent bell section 15 of one pipe and the ring 27 into tight engagement with the outer surface of the adjacent cylinder 12 of the other pipe. After the wedge ring 28 has been driven home a filling material 32 such as cement mortar is positioned in the chamber 30 thereby completing the joint structure between the two lengths of pipe.

In Fig. 7 I have indicated a modified form of concrete pipe generally at 33. As shown the pipe 33 comprises a metal reinforcing cylinder 34 embedded between an inner layer of concrete 35 and an outer layer of concrete 36. At one end of the pipe 33 the cylinder 34 includes an integral reduced spigot section 37 which is joined to the main portion of the cylinder by a tapered portion 38. The end of the inner layer of concrete 35 adjacent the spigot end of the cylinder terminates in a plane face 39 flush with the adjacent end of the cylinder. The opposite end of the inner layer of concrete is set back from the adjacent end of the cylinder and is beveled outwardly as indicated at 40. The end of the outer layer of concrete 36 adjacent the spigot end of the cylinder terminates in a beveled face 41 which is a continuation of the outer surface of the tapered portion 38 of the cylinder. The opposite end of the outer layer of concrete 36 together with the end of the cylinder is beveled outwardly at 42.

Positioned on the spigot portion 37 of the cylinder I provide a ring of preformed packing material 43 the outer diameter of which is approximately the same as the inner diameter of the cylinder. The end face of the packing material abuts the tapered portion 38 of the cylinder, and the outer end face of the packing is spaced inward from the adjacent end of the spigot portion.

In forming a joint between two lengths of the pipe 33 an outer ring of resilient material 44, an inner ring of resilient material 45 and a wedge ring 46 similar to the resilient rings 26 and 27 and the wedge ring 28 previously described are used.

When joining two lengths of pipe 33 the resilient rings and the wedge ring are positioned in the end 40 of one pipe and then the spigot end of the other pipe is positioned in the cylinder of the first pipe to a location whereby the end 42 of the first pipe abuts the end 41 of the other pipe. In this position a chamber 47 is left between the adjacent ends 39 and 40 of the pipes. After the pipes have been thus positioned together a caulking material 48 such as lead wool is positioned in the space between the cylinder 34 of one pipe and the spigot portion 37 of the other pipe. The caulking 48 is tightly driven against the packing 43 and extends from the packing 43 to a point spaced from the adjacent end of the cylinder. After the caulking 48 has been placed around the spigot portion 37 of one pipe and between the caulking 43 and the adjacent end of the cylinder the outer resilient ring 44 is placed over the first ring.

The apex of the wedge ring 46 is then positioned between the two resilient rings. Thereafter the wedge ring 46 is driven between the two resilient rings into the caulking material 48. As the wedge ring 46 is driven into the caulking material 48 it forces the inner resilient ring 45 into tight engagement with the spigot portion 37 of the one pipe and the outer resilient ring 44 into tight engagement with the inner surface of the cylinder 34 of the other pipe. After the wedge ring 46 has been driven home a filling material 49 such as cement mortar is positioned in the chamber 47 thereby completing the joint structure between the two lengths of pipe.

In Fig. 8 I have indicated a further modified form of concrete pipe generally at 50. As shown the pipe 50 comprises a metal reinforcing cylinder 51 embedded between an outer layer of concrete 52 and an inner layer of concrete 53. At one end the cylinder 51 includes an integral enlarged bell section 54 which is joined to the main portion of the cylinder by a tapered portion 55. The outer end of the bell section 51 is preferably curved outwardly as indicated at 56. Adjacent the opposite end of the cylinder 51 I provide a metal band 57 which is spaced inwardly from the adjacent end of the cylinder. The band 57 is shown as triangular in cross-section with the base engaging the cylinder and secured thereto as by spot welding as indicated at 58. The outside diameter of the band 57 is approximately the same size as the inside diameter of the bell section 54.

Adjacent the bell end of the pipe the inner layer of concrete 53 terminates in a curved face 59 to which the tapered portion 55 of the cylinder is tangent. At the opposite end the inner layer of concrete terminates in a plane face 60 flush with the adjacent end of the cylinder. At the bell end of the pipe the outer layer of concrete 52 terminates in an outwardly curved face 61, the inner end of which is flush with the adjacent end of the cylinder. The opposite end of the outer layer of concrete 52 is spaced inward from the band 57 and terminates in a curved face 62 having extending therefrom adjacent the cylinder a reduced flange portion 63.

Adjacent the curved end 56 of the bell section 54 I provide in the bell portion and in the outer layer of concrete a plurality of spaced apertures 64 which are grouped together in the portion which when the pipe is laid becomes the upper portion thereof. (See Fig. 9.) As shown the apertures 64 are frusto-conical in shape with the small end thereof opening outward. In forming a joint between two lengths of the pipe 50 an outer ring of resilient material 65, an inner ring of resilient material 66 and a metal wedge ring 67 similar to the rings 26, 27 and 28 previously described are used.

When joining two lengths of pipe 50 the resilient rings and the wedge ring are positioned in the bell section of one length and then the opposite end of the other length is positioned in the bell section of the first length at a location where the end 61 of the first length engages the end 62 of the second length. In this position a chamber 68 is formed between the bell section 54 of one length and the cylinder of the other length which extends from the inner face of the band 57 to the outer face of the reduced flange portion 63. Furthermore, when the lengths are thus positioned together a chamber 69 is left between the adjacent ends 60 and 59 of the lengths. After the lengths have been thus positioned together a caulking material 70 such as lead wool is positioned in the space between the bell section 54 of one length and the cylinder of the other length.

The caulking 70 is tightly driven against the outer face of the band 57 and extends from the band 57 to a distance spaced from the adjacent end of the cylinder. After the caulking 70 has been placed in position the inner resilient ring 66 is placed around the pipe cylinder between the caulking 70 and the adjacent end of the cylinder and then the outer resilient ring 65 is placed over the first ring. The apex of the wedge ring 67 is then positioned between the two resilient rings.

Thereafter the wedge ring is driven between the two resilient rings into the caulking material 70. As the wedge ring 67 is driven into the caulking material 70 it forces the inner resilient ring 66 into tight engagement with the cylinder of the one pipe and the outer resilient ring 65 into tight engagement with the bell section 54 of the other pipe. After the wedge ring 67 has been driven home a filling material 71 is positioned in the chamber 69. This secures the wedge ring in place. Thereafter a molten metal 72 such as lead is poured into the chamber 68 through the apertures 64 thereby completing the joint structure between the two lengths of pipe 50.

In Fig. 10 a still further modified form of concrete pipe is indicated generally at 75. As shown the pipe 75 comprises a metal reinforcing cylinder 76 embedded between an outer layer of concrete 77 and an inner layer of concrete 78. At one end the cylinder 76 includes an enlarged bell section 79 which is joined to the main portion of the cylinder by an integral tapered portion 80. Intermediate the length of the bell section 79 I provide therein a metal band 81. The band 81 is shown as triangular in cross section with the base thereof engaging the inner surface of the bell section and secured thereto by spot welding as indicated at 82. The inside diameter of the band 81 is approximately the same as that of the outside diameter of the cylinder.

Adjacent the bell end of the pipe the inner layer of concrete 78 terminates adjacent the juncture of the main portion of the cylinder and the tapered portion 80 and is beveled as at 83. The opposite end of the inner layer of concrete terminates flush with the adjacent end of the cylinder and is beveled as at 84 to match the opposite end. The end of the cylinder 76 adjacent the end 84 of the inner layer of concrete is beveled as at 85, to match the angle of the tapered portion 80. The outer layer of concrete 77 adjacent the bell end of the pipe terminates in a plane face 86 flush with the adjacent end of the cylinder. The opposite end of the outer layer of concrete is set inward from the adjacent end of the cylinder and is beveled as indicated at 87.

Adjacent the end of the cylinder 76 opposite the bell end I provide in the cylinder and in the inner layer of concrete a plurality of spaced apertures 88 which are grouped together on the portion which when the pipe is laid becomes the upper portion thereof. As shown the apertures 88 are frusto-conical with the small end thereof opening inward.

In forming a joint between two lengths of the pipe 75 an outer resilient ring 89, an inner resilient ring 90 and a metal wedge ring 91 similar to the rings 26, 27 and 28 previously described are used.

When joining two lengths of pipe 75 the resilient rings and the wedge ring are positioned over the end of the cylinder of one length which is then positioned in the bell section 79 of the other length at a location wherein the end 84 of the first length engages the end 83 of the second length. In this position a chamber 92 is formed between the cylinder of the first length and the bell section of the second length which extends from the inner face of the band 81 to the tapered portion 80. Furthermore, when the lengths are thus positioned together a chamber 93 is left between the adjacent ends 86 and 87 of the lengths. After the lengths have been thus positioned a caulking material 94 such as lead wool is positioned in the space between the cylinder of the first length and the bell section of the second length.

The caulking 94 is tightly driven against the outer face of the band 81 and extends from the band 81 to a distance spaced from the adjacent end of the bell section of the cylinder. After the caulking 94 has been placed in position the inner resilient ring 90 is positioned in the space between the outer end of the caulking and the adjacent end of the bell section and then the outer resilient ring 89 is placed over the first ring. The apex of the wedge ring 91 is then positioned between the two resilient rings. Thereafter the wedge ring is driven between the two resilient rings into the caulking material 94. As the wedge ring 91 is driven into the caulking material 94 it forces the inner resilient ring 90 into tight engagement with the cylinder of the one length and the outer resilient ring 89 into tight engagement with the bell section of the other length.

After the wedge ring 91 has been driven home a filling material 95 is positioned in the chamber 93. Thereafter a molten metal 96 such as lead is poured into the chamber 92 through the apertures 88 by suitable means thereby completing the joint construction between two lengths of pipe 75.

From the foregoing description it will be apparent that I have provided a novel concrete pipe and joint construction for connecting two sections of the pipe which is simple in construction and highly efficient in use.

Having thus described my invention, I claim:

1. A conduit comprising a plurality of lengths of concrete pipe laid end to end, each of said lengths comprising a metal reinforcing cylinder embedded between an outer and an inner layer of concrete, said cylinder at one end including an integral reduced spigot section, and at the other including an integral bell section, the end of said outer layer of concrete adjacent said bell end terminating in a beveled face in line with the tapered surface of said spigot section, the opposite end of said outer layer of concrete being outwardly beveled, the opposite end of said inner layer of concrete terminating in a beveled face set inward from the adjacent end of said cylinder, a preformed ring of packing material surrounding the spigot portion of said cylinder, the inner end face of said packing engaging said tapered portion of said spigot portion and the outer end face of said packing being spaced inward from the end of the cylinder, the outer diameter of said packing ring being approximately the same as that of the inside of said cylinder, said lengths being laid with one end surrounding the spigot portion of an adjacent end, the adjacent ends of said outer layers of concrete abutting and with a chamber between the adjacent ends of said inner layers of concrete, a caulking material positioned in the space between the cylinder of one length and the spigot section of an adjacent length, said caulking engaging said packing and means to hold said caulking in place.

2. A conduit comprising a plurality of lengths of concrete pipe laid end to end, each of said lengths comprising a metal reinforcing cylinder embedded between an outer and an inner layer of concrete, said cylinder at one end including an integral enlarged bell section, the outer end portions of said bell section being curved outwardly, the end of said inner layer of concrete adjacent said bell end terminating in an outwardly curved face intersecting said tapered surface of said bell section, a metal band surrounding said cylinder adjacent the end opposite said bell section, said band being positioned inward from the adjacent end of said cylinder and secured thereto, the end of said outer layer of concrete adjacent said bell section terminating flush with the outer end of said bell section and being curved outwardly, the opposite end of said outer layer of concrete terminating in a curved surface having a reduced shoulder thereon set inward from said band, said lengths being laid with one bell end surrounding the band on the adjacent spigot end with a chamber between the adjacent ends of said inner layers of concrete, a caulking material positioned in the space between the cylinder of one pipe and the adjacent bell section, said caulking engaging said band and extending to a position spaced from the adjacent end of said cylinder, and a cast packing material positioned in the space between the bell ring of one length and the cylinder of the adjacent length and between the band of one length and the adjacent end of the outer layer of concrete of the adjacent length.

3. A conduit comprising a plurality of lengths of concrete pipe laid end to end, each of said lengths including at one end an enlarged bell section and at the opposite end a spigot portion, said spigot portion of one length being positioned in the bell portion of the other length, the inner end of said spigot portion being spaced from the end of the adjacent length to form a chamber opening into the inside of the conduit, there being a space defined by a cylindrical inner face on said bell portion and a cylindrical outer face at the extreme end of and on the outside of said spigot portion where they overlap, a caulking material in said space between said bell and spigot portions, a resilient ring surrounding said spigot portion at its extreme end and engaging said caulking, a second resilient ring positioned over said first ring and engaging said bell portion, means to force said two resilient rings apart to thereby force said first ring into tight engagement with said spigot portion of the one length and to force the second resilient ring into tight engagement with said bell section of the other length.

BOZIDAR J. UKROPINA.